INVENTORS
ROBERT E. FABER &
JOHN R. THOMSON
BY
ATTORNEYS

United States Patent Office 3,001,058
Patented Sept. 19, 1961

3,001,058
METHOD OF WELDING INTERLINED STRUCTURES
Robert E. Faber, Chicago, and John R. Thomson, Park Forest, Ill., assignors to Rheem Manufacturing Company, Richmond, Calif., a corporation of California
Filed July 3, 1959, Ser. No. 824,822
4 Claims. (Cl. 219—127)

The present invention relates generally to methods of welding interlined water heater tanks, boilers, and the like, by which an efficient welding together of the backing members as well as a permanent seal and attachment between the liner sections is obtained, and more particularly, to such a method which is particularly adapted to extreme simplicity in the production requirements to conduct the process.

In the fabrication of water heater tanks formed of sheet steel and provided on its inner side with a relatively thick deposit or separate liner of non-corrosive material, it has been found particularly difficult by conventional welding methods to provide, in addition to an effective joinder of the steel members, a proper seal between the non-corrosive liners at the joints between the body and end wall sections of the tank. One method of effectively accomplishing the foregoing, however, is disclosed in the copending application of Ralph H. Gieser Jr., et al., Serial No. 599,199. As disclosed therein, a joint between tank sections, each having a backing sheet of steel and a separate non-corrosive liner at one side thereof formed of a material having a lower melting point than the steel, e.g., aluminum, copper, or the like, is provided with an annular seal between the liner portions on at least one side of a steel to steel weld of the shell portions. In accomplishing such joint, the sections are placed in engagement with the steel sheets in opposing spaced relation and the liners interposed therebetween and in contact with each other. The steel sheets are then, generally, electric resistance seam welded together by exerting external pressure against the exposed sides of the sheets sufficient to expel substantially all of the liner portions in the pressure area and to weld the sheets together in such area. Electric current is in addition passed through portions of the adjoining sections in an area adjacent the steel to steel weld area without the application of the external pressure thereto but with the current such that the liners in such adjacent area will be fused together.

The present invention provides a substantially similar or equivalent sealed welded joint between tank sections as that disclosed by said copending application but by a wholly non-analogous and simplified method which is particularly advantageous from the standpoint of the minimal production requirements in its conduction. More specifically, in accordance with the present invention, it has been found that a thorough fusion and bonding of the non-corrosive liners of the tank sections can be produced adjacent a steel to steel weld of the backing sheets of such sections without the application of external pressure to the exposed sides of the sheets being required to expel the liner material from the steel to steel weld area. In the present method, the application of heat establishes internal expansive forces or pressures in the backing sheets which forcibly urge the lower melting point liner material aside. The liner material is replaced with the steel to form a homogeneous steel to steel weld and there is a fused bonded thickening of the liner material at the points adjacent to the weld. By eliminating the requirement of externally applied pressure, the method of the present invention facilitates the construction of efficient sealed joints in interlined structures with a resultant simplification in the apparatus requirements for the accomplishment of same.

It is therefore an object of the present invention to provide a method of welding interlined steel tanks which is relatively simple and less complex than previous interlined structure joining methods.

Another object of this invention is the provision of a method of joining sections formed by a backing member and liner at its inner side which will produce a welding together of the backing members as well as a permanent seal and attachment between the liner sections without the application of external welding pressure during the joining process.

A further object of the present invention is to provide a welded sealed joint of the character described in which the weld is relatively free of impurities.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
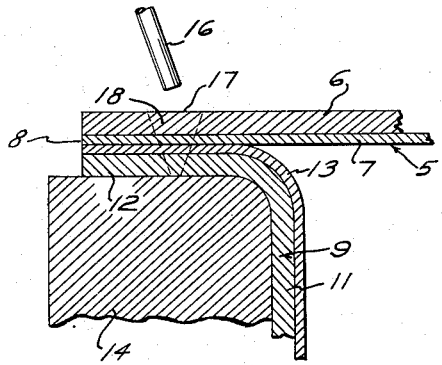
FIGURES 1 and 2 are fragmentary longitudinal views of the body and end walls of a water heater tank before and after the welding operation.

The invention is illustrated in connection with the formation of a joint between the body and end wall of a water heater tank in which each section incorporates a backing of sheet steel which is provided with a sheet of non-corrosive material such as copper or the like, which is designed to provide a protective liner for the interior of the tank. As shown in the drawing, the tank includes a generally cylindrical body 5 having a steel backing or outer shell 6 and an inner independent lining 7 of copper, aluminum or similar non-corrosive material. The portion of the body illustrated is that adjacent the lower end 8 thereof, and this end is arranged to be closed by means of a bottom end wall 9 having a dished central portion 11 and a peripheral skirt or flange 12. The end wall is also formed of steel and is provided on the inner side thereof with a lining 13 similar to and fusible with the lining 7 of the body. As will be clear from FIGURE 1, the outside diameter of the portion of the liner of flange 12 substantially coresponds with the inner diameter of the body liner 7 so that when the end wall is inserted in operative position within the end of the body, the opposing surfaces of the respective liners will be in engagement.

As previously set forth it is desired to join the body and end wall together in such manner that a welded joint will be provided between the steel backing members and a fused permanently sealed joint will be provided between the separate liner portions on at least the side of the welded joint exposed to the contents of the tank. Moreover, in order that the welded sealed joint be formed with a minimum of complexity in the process production equipment required in the joining operation, it is desired that the joint be formed without the application of external welding pressure heretofore required in the formation of a joint of this general character to expel the liner material from the region of the resultant weld of the backing members.

It has now been found that a homogeneous steel to steel welding together of the backing members 6 and 9 and a permanent fused seal between the liners 7 and 13 in the regions adjacent the weld is obtained by the application of heat to one of the backing members such that the resulting internal pressures due to thermal expansion forces of the steel backing members expel molten liner material from the heated area prior to the time the steel becomes fluid. More particularly, heat is applied to, for example, the body backing member 6 in the end region of the tank adjacent the flange 12 where the backing members 6 and 9 are in opposing spaced relation and the liners 7, 13 are interposed therebetween in contacting engagement. The outer steel backing member 6 is hence first heated in a localized area and the copper liners 7, 13 are in turn heated by thermal conduction in an area under the heated localized area of the backing member. The other steel backing member 9 is similarly finally heated by conduction of heat thereto from the liners. The backing members 6, 9 and liners 7, 13 expand due to the rise in temperatures thereof and the copper or other liner material melts before the steel becomes fluid by virtue of the substantially lower melting temperature thereof. The steel backing members 6, 9 continue to expand after the copper melts and the outer backing member 6 expands faster than the bottom backing member 9 inasmuch as there is a conduction temperature gradient therebetween. The difference in the expansion rates of the backing members 6, 9 tends to produce expansion pressures in the molten region of the liners which are directed longitudinally outward therefrom. These expansion pressures force the molten liner material aside and, as the steel of the backing members melts, it replaces the copper in the area directly under the localized area of heating of the outer backing member 6. There is hence formed a steel to steel weld of the backing members 6, 9 and a thoroughly fused thickening of the expelled copper at the points adjacent the weld which form permanent seals of the liners 7, 13 thereat.

In general, the foregoing unique joining operation in accordance with the present invention is thus accomplished merely by the direct application of heat to one, not both, of the backing members 6, 9. Although the heat may be supplied in any suitable manner, it is preferred to supply such heat by means of an electric arc. As will be seen from the drawing, for example, FIGURES 1 and 2, the tank structure including the lined body 5 and lined end wall 9 in preassembled relation is first placed into a welding fixture as shown generally at 14. Such fixture is preferably shaped to fit the inner periphery of the dished out portion 11 and flange 12 of end wall 9 and is adapted to rotate the entire tank about its axis. In order to establish an electric welding arc for applying heat to the previously mentioned localized area of the tank backing member 6, an arc electrode 16 of conventional arc welding apparatus (not shown) is spaced radially outward from the backing member 6 in the region engaging the flange 12 of end wall 9. The electrode 16 may be of consumable metal, carbon, or the like, and the electrode may be coated with a suitable flux, while the tank is grounded as is customary in conventional arc welding practice. Hence when an arc is struck and current flows through the electrode into the tank structure, it heats the outer steel backing member 6 in a localized area 17 beneath the electrode. The heat is conducted from region 17 to the liners 7, 13 and opposed backing member 9 in the fashion detailed hereinbefore and the overall conduction region 18 through the materials to the fixture 14 is substantially V or plug shaped in section by virtue of the temperature gradient thereacross. The thermal expansion pressures established in the heat conduction region 18 force or expel the copper liner material therefrom to produce a steel to steel weld of the backing members 6, 9 therein and thickened fused seals 19, 21 of the liners 7, 13 on opposite sides of the weld as depicted in FIGURE 2. It is also believed that the welding fixture 14, defining a generally solid backing, assists in effecting the generally longitudinal flow of the liner material.

It has been demonstrated in practice that the weld of the backing members is without the presence of copper, except perhaps in minute quantities. Furthermore, some of the copper floats up through the molten steel in combination with a flux which may be used in a conventional manner and a welding bead 22 containing copper is provided at the localized area 17 of backing member 6. This tends to eliminate impurities in the steel so that a better weld is affected.

Figure 2:
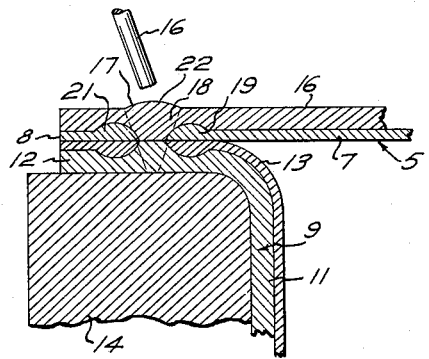
Figure 3:
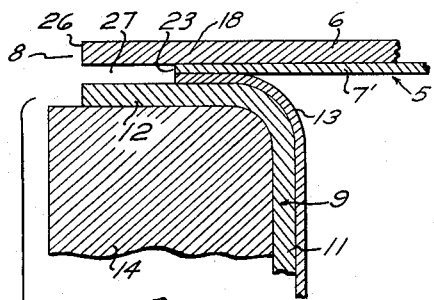
FIGURES 3 and 4 are views similar to FIGURES 1 and 2 respectively, but illustrating a modified form of the invention, FIGURE 3 disclosing the structure in two separate stages before the welding operation.
Figure 4:
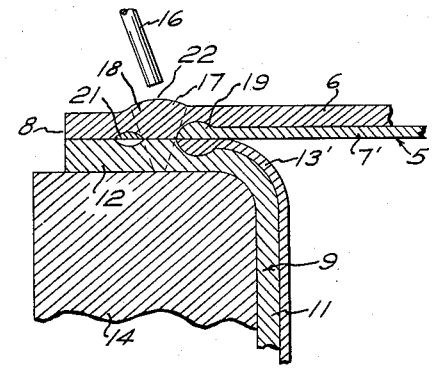

In the embodiment illustrated in FIGURES 1 and 2, an annular seal between the copper liners will be effected on both sides of the steel to steel weld. However, since it is the seal at the side adjacent the interior of the tank that is essential for sealing off the interior of the inner receptacle from the steel shell, the liners 7' and 13' may as shown in FIGURES 3 and 4 be foreshortened so as to terminate as at 23 preferably within the heat conduction area 18, the steel portions 6 and 12 continuing therebeyond and terminating at 26. Before the electrode 16 may be brought into play, the gap 27 between the portions 6 and 12 is first eliminated by deforming the portions into adjacent relation as shown in the lowermost illustration of FIGURE 3. Thereafter, upon current flow through electrode 16 and zone 18, the steel to steel weld will be created as previously explained with the fused seal 19 being substantially larger than the seal 21, and in some instances, the latter may be completely avoided, leaving but a single seal between the liners.

What is claimed is:

1. In the art of fabricating tanks and the like with different sections each having a backing sheet of steel and a separate liner at one side thereof formed of a non-corrosive material having a melting point lower than the steel, the method of joining said sections which comprises placing the sections in engagement with the steel sheets in opposing spaced relation and the liners interposed therebetween and in contact with each other, and applying heat to the exposed exterior face of the backing sheet of one of the engaged sections for conduction therebetween simultaneously while generating internal thermal expansion pressures within the heated area of the sections sufficient to expel substantially all of the liner portions therefrom and to weld the sheets together in such area while forming thoroughly fused sealed thickenings of the expelled liner material in regions adjacent the welded sheet area.

2. A method of fusing independent liners of sheet material together while in contact and simultaneously welding a pair of relatively higher melting point metal members between which the liners are interposed, which comprises heating the members and liners in a selected region by applying heat to the exterior face of one of said members in a localized area overlying the selected region with the heat being conducted therefrom to the liners and other member to melt the liner material and establish internal thermal expansion forces in the selected region acting in a direction to expel substantially all of the melted liner material therefrom and form a fused thickening of the expelled liner material on at least one side of the selected region, said thickening establishing a fused seal between the liners, and continuing the heating of said selected region to melt the higher melting point metal of the members and replace the expelled liner material with the higher melting point metal in said region to weld the members together thereat.

3. In the art of fabricating tanks and the like with a cylindrical body and a closure member having a cylindrical flange to fit within an end of said body, said body and said closure member including said flange being composed of an outer metal wall and a separate inner wall of material having a lower melting point and greater corrosion resistance than the material of said outer wall, the flange being inserted within the body with the inner walls interposed between the outer walls and engaged with each other, the method of joining said flange to the body which comprises applying heat to one of said outer walls in a localized area of its exterior face to conduct said heat to the inner walls and second outer wall in a thermal conduction region beneath said localized area in sufficient quantity to melt the inner walls in said conduction region and simultaneously generate thermal expansion pressures in the outer walls to force the molten inner wall material out of the conduction region and form thoroughly fused sealed thickenings of the expelled inner wall material immediately adjacent the conduction region, and continuing said application of heat to the localized area of the first outer wall to melt the material of the outer walls and replace the expelled inner wall material in the conduction region therewith.

4. In the art of fabricating tanks and the like with different sections each having a backing sheet of steel and a separate liner at one side thereof formed of copper or other material having a melt point lower than the steel, the method of attaching and sealing said sections which comprises placing the sections in engagement with the steel sheets in opposing spaced relation and the copper liners interposed therebetween and in contact with each other, applying a welding arc to a localized area of the exterior face of one of said steel sheets to heat same, the heat from said arc being conducted from said localized area to the copper liners and second steel sheet through a conduction region beneath the localized area, and rotating the engaged sections beneath the welding arc at a sufficiently slow rate that the copper is melted in said conduction region and expelled therefrom by thermal expansion forces exerted thereon from said steel sheets to form thickened fused seals of copper between the liners on opposite sides of said conduction region and the steel sheets are subsequently melted to replace the copper in said conduction region and form a steel to steel weld therein between the backing sheets.

References Cited in the file of this patent

UNITED STATES PATENTS

| | | |
|---|---|---|
| 1,750,643 | Murray | Mar. 18, 1930 |
| 2,481,614 | Redmond | Sept. 13, 1949 |